(12) United States Patent
Yang et al.

(10) Patent No.: US 11,017,325 B2
(45) Date of Patent: May 25, 2021

(54) PASSIVE VISIT DETECTION

(71) Applicant: Foursquare Labs, Inc., New York, NY (US)

(72) Inventors: Stephanie Yang, New York, NY (US); Lauren Hannah, Millburn, NJ (US); Daniel Kronovet, New York, NY (US); Catgatay Berk Kapicioglu, New York, NY (US)

(73) Assignee: Foursquare Labs, Inc., New York, NY (US)

( * ) Notice: Subject to any disclaimer, the term of this patent is extended or adjusted under 35 U.S.C. 154(b) by 774 days.

(21) Appl. No.: 15/704,899

(22) Filed: Sep. 14, 2017

(65) Prior Publication Data

US 2018/0082206 A1    Mar. 22, 2018

Related U.S. Application Data

(60) Provisional application No. 62/395,827, filed on Sep. 16, 2016.

(51) Int. Cl.
*G06N 20/20* (2019.01)
*G06N 20/00* (2019.01)
(Continued)

(52) U.S. Cl.
CPC ............. *G06N 20/20* (2019.01); *G06F 16/29* (2019.01); *G06N 20/00* (2019.01); *H04W 4/021* (2013.01);
(Continued)

(58) Field of Classification Search
CPC ........ G06N 20/20; G06N 20/00; G06N 7/005; G06N 5/003; G06F 16/29; H04W 4/021;
(Continued)

(56) References Cited

U.S. PATENT DOCUMENTS 9,253,596 B2   2/2016  Sridhara et al.
9,860,704 B2   1/2018  Kapicioglu et al.
(Continued)

FOREIGN PATENT DOCUMENTS

JP          2007336486       12/2007
KR    10-2014-0000566        1/2014
(Continued)

OTHER PUBLICATIONS

PCT International Search Report and Written Opinion in PCT/US2017/051879, dated Dec. 22, 2017, 16 pages.
(Continued)

*Primary Examiner* — Marthe Y Marc-Coleman

(57) ABSTRACT

This disclosure relates to systems and methods for passive visit detection. In aspects, a mobile device comprising a set of sensors may collect and store sensor data from the set of sensors in response to detecting a movement event or user interaction data. The collected sensor data may be processed and provided as input to one or more predictive or statistical models. The model(s) may evaluate the sensor data to detect mobile device location, movement events and visit events. The model(s) may also be used to determine correlations between features of the sensor data and movement- or location-based events, optimize the types of data collected by the set of sensors, extend localized predictions to large-scale ecosystems, and generate battery-efficient state predictions. In aspects, the model(s) may be trained using labeled and/or unlabeled data sets of sensor data.

20 Claims, 4 Drawing Sheets

(51) Int. Cl.
  *G06F 16/29* (2019.01)
  *H04W 4/021* (2018.01)
  *H04W 4/38* (2018.01)
  *G06N 7/00* (2006.01)
  *G06Q 30/02* (2012.01)
(52) U.S. Cl.
  CPC ......... *G06N 7/005* (2013.01); *G06Q 30/0201* (2013.01); *H04W 4/38* (2018.02); *Y02D 30/70* (2020.08)
(58) Field of Classification Search
  CPC ....... H04W 4/38; H04W 4/025; H04W 88/18; Y02D 70/14; Y02D 70/166; Y02D 70/144; Y02D 70/164; Y02D 70/10; Y02D 70/142; Y02D 70/00; G06Q 30/02
  See application file for complete search history.

(56) References Cited

U.S. PATENT DOCUMENTS

| | | | |
|---|---|---|---|
| 10,185,973 | B2 | 1/2019 | Priness et al. |
| 2012/0307645 | A1 | 12/2012 | Grosman et al. |
| 2013/0226857 | A1 | 8/2013 | Shim et al. |
| 2013/0325855 | A1* | 12/2013 | Kapicioglu ......... G06F 16/9537 707/724 |
| 2013/0336138 | A1 | 12/2013 | Venkatraman et al. |
| 2014/0358836 | A1 | 12/2014 | Moore et al. |
| 2015/0105098 | A1* | 4/2015 | Sridhara ............... G01S 5/0252 455/456.1 |
| 2015/0149393 | A1* | 5/2015 | Hwang .................. G06N 20/00 706/12 |
| 2015/0248436 | A1* | 9/2015 | Podemsky ............ H04W 4/029 707/724 |
| 2016/0019465 | A1 | 1/2016 | Milton et al. |
| 2016/0066150 | A1 | 3/2016 | Chao et al. |
| 2016/0350812 | A1 | 12/2016 | Priness et al. |
| 2016/0360377 | A1* | 12/2016 | Lovich .................. H04W 4/022 |
| 2017/0032248 | A1 | 2/2017 | Dotan-Cohen et al. |
| 2018/0082206 | A1 | 3/2018 | Yang et al. |
| 2020/0356900 | A1 | 11/2020 | Briancon et al. |

FOREIGN PATENT DOCUMENTS

| | | | |
|---|---|---|---|
| KR | 20140000566 | A * | 1/2014 |
| WO | 2002093877 | | 11/2002 |

OTHER PUBLICATIONS

PCT International Search Report and Written Opinion in PCT/US2017/051568, dated Dec. 22, 2017, 13 pages.
PCT International Preliminary Report on Patentability in PCT/US2017/051568, dated Mar. 19, 2019, 10 pages.
PCT International Preliminary Report on Patentability in PCT/US2017/051879, dated Mar. 19, 2019, 12 pages.
Non-Final Rejection dated Jun. 26, 2019 for U.S. Appl. No. 15/689,683, 14 pages.
Final Rejection dated Jan. 7, 2020 for U.S. Appl. No. 15/689,683, 5 pages.
Notice of Allowance dated Apr. 22, 2020 for U.S. Appl. No. 15/689,683, 22 pages.
Extended European Search Report dated Apr. 3, 2020 for EP Application No. 17851530.0, 8 pages.
Extended European Search Report dated Apr. 3, 2020 for EP Application No. 17851650.6, 8 pages.
U.S. Appl. No. 15/689,683, Non-Final Rejection dated Feb. 9, 2021, 24 pages.
European Patent Application No. 17851530.0, Communication pursuant to Article 94(3) EPC dated Feb. 23, 2021, 7 pages.
European Patent Application No. 17851650.6, Communication pursuant to Article 94(3) EPC dated Feb. 23, 2021, 7 pages.

* cited by examiner

PASSIVE VISIT DETECTION

CROSS-REFERENCE TO RELATED APPLICATIONS

This application claims priority from provisional U.S. Application Ser. No. 62/395,827, filed Sep. 16, 2016, entitled "PASSIVE VISIT DETECTION," which application is incorporated herein by reference in its entirety.

BACKGROUND

Visit detection systems enable determinations related to location and visit patterns of mobile devices. In many cases, the visit detection systems rely almost exclusively on periodic geographic coordinate system data (e.g., latitude, longitude and/or elevation coordinates) to determine the location of a mobile device. For example, the geographic coordinate system data may be used to determine whether a detected stop by a mobile device correlates with a particular venue or events associated therewith. However, the almost exclusive use of geographic coordinate system data may result in inaccurate venue and/or visit detection.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for passive visit detection. In aspects, a mobile device comprising a set of sensors may collect and store sensor data from the set of sensors in response to detecting a movement event or user interaction data. The collected sensor data may be processed and provided as input to one or more predictive or statistical models. The model(s) may evaluate the sensor data to detect mobile device location, movement events and visit events. The model(s) may also be used to determine correlations between features of the sensor data and movement-/location-based events, optimize the types of data collected by the set of sensors, extend localized predictions to large-scale ecosystems, and generate battery-efficient state predictions, among others. In some aspects, the model(s) may be trained using labeled and/or unlabeled data sets of sensor data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
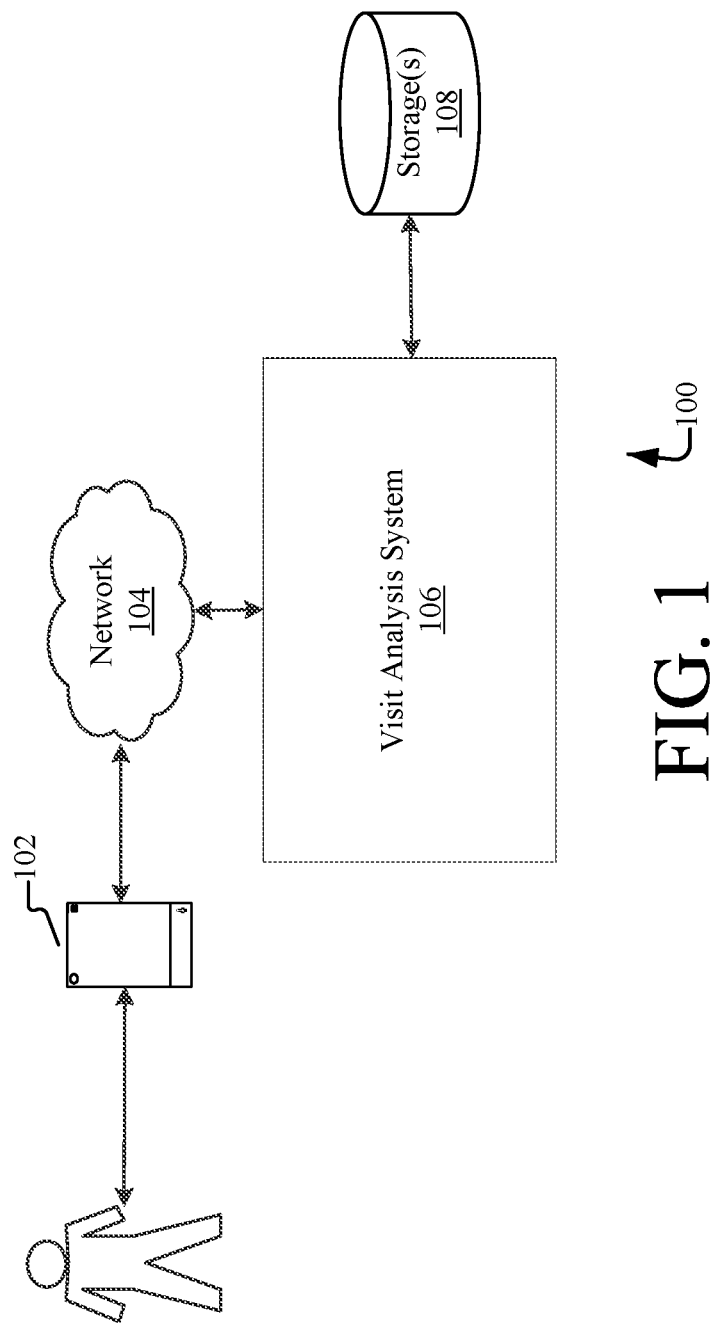
FIG. 1 illustrates an overview of an example system for passive visit detection as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describe systems and methods for passive visit detection. Passive visit detection, as used herein, may refer to the use of implicit indicia to determine whether a mobile device (or a user thereof) is visiting, or has visited, a particular venue or geographic location. As opposed to active visit detection, which uses explicit user signals (such as user-confirmed venue check-in data), passive visit detection relies on the passive collection of data from various sensors of a mobile device. The analysis of data from various mobile device sensors increases the accuracy and efficiency of visit detections over conventional approaches that only use geographic coordinate system data.

In aspects, a mobile device may comprise one or more sensors. Exemplary sensors may include GPS sensors, Wi-Fi sensors, proximity sensors, accelerometers, ambient temperature sensors, gyroscopes, light sensors, magnetometers, hall sensors, acoustic sensors, a touchscreen sensor, etc. The mobile device may monitor data detected by the sensors as the mobile device is used and/or transported by a user. The mobile device may also detect events, such movement events, purchase events, information delivery events, venue check-in events, etc. In some aspects, the detection of an event may cause the sensor data to be collected and processed. Processing the sensor data may include parsing the sensor data to identify one or more features of the sensor data and organizing the parsed data into one or more data sets. In at least one aspect, the sensor data may be accessible via an application or service accessible to a computing device, such as the mobile device. The application/service may enable a user to navigate and/or manipulate the sensor data. For example, the application/service may enable a user to correlate sensor data to events (e.g., entry/exits events, visiting events, check-in events, promotional events, etc.) and/or label sensor data associated with events. The labeled data may be organized into one or more sets of sample data or training data.

In aspects, the sensor data and/or training data may be provided as input to one or more predictive or statistical models. A model, as used herein, may refer to a predictive or statistical model that may be used to determine a probability distribution over one or more character sequences, classes, objects, result sets or events, and/or to predict a response value from one or more predictors. A model may be a rule-based model, a machine-learning regressor, a machine-learning classifier, a neural network, or the like. In examples, the sensor data and/or training data may be used to train a model to detect mobile device location, movement events and/or visit events. Additionally, the sensor data and/or training data may be used to train a model to determine correlations between features of the sensor data and movement- or location-based events, optimize the types/categories of data collected by the set of sensors. In some examples, the sensor data and/or training data may be used to extend localized predictions to large-scale ecosystems. For instance, sensor data for a user (or a small group of users) may be generalized to represent a larger group of users or various groups of users. In some examples, sensor data and/or training data may be collected in a battery-efficient manner. For instance, sensor data may be collected at periodic intervals (e.g., once a minute, hour, day, etc.) or on demand, as opposed to a more battery-intensive continuous sensor polling and collection process. In aspects, a trained model may use sensor data of a device to detect the device's current and/or previous location, movement events, visit events and venue-related events.

Accordingly, the present disclosure provides a plurality of technical benefits including but not limited to: using sensor data to train a statistical model to detect passive visit events; correlating sensor data to movement and/or location events; determining a user's true motion state by eliminating/mitigating GPS "noise" and jitter; utilizing a user interface to label a data set of sensor data; automatically modifying the types/categories of data collected by sensors, enabling the collection of venue/location data using various mobile device sensors; battery-efficient data collection; and improved efficiency and quality for applications/services utilizing examples of the present disclosure, among other examples.

FIG. 1 illustrates an overview of an example system for venue detection as described herein. Example system 100 presented is a combination of interdependent components that interact to form an integrated whole for venue detection systems. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the example operating environments depicted in FIG. 4. In other examples, the components of systems disclosed herein may be spread across multiple devices. For instance, input may be entered on a client device and information may be processed or accessed from other devices in a network, such as one or more server devices.

As one example, the system 100 comprises client device 102, distributed network 104, visit analysis system 106 and a storage 108. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

Client device 102 may be configured to collect sensor data related to one or more venues. In aspects, client device 102 may comprise, or have access to, one or more sensors. The sensors may be operable to detect and/or generate sensor data for client device 102, such as GPS coordinates and geolocation data, positional data (such as horizontal and/or vertical accuracy), Wi-Fi information, OS information and settings, hardware information, signal strengths, accelerometer data, time information, etc. Client device 102 may collect and store the sensor data in one or more data stores. The data stores may be local to client device 102, remote to client device 102, or some combination thereof. For instance, sensitive user information such as user, account and/or device identifying information may be stored on a client device, whereas location, movement and promotional data may be stored in a distributed storage system. In some aspects, client device 102 may collect and/or store sensor data in response to detecting an event, a location or the satisfaction of one or more criteria. For instance, sensor data may be collected from a set of sensors in response to a movement event (e.g., an acceleration, a directional modification, prolonged idling, etc.) by client device 102. In examples, detecting a stop may include the use of one or more machine learning techniques or algorithms, such as expectation-maximization (EM) algorithms, Hidden Markov Models (HMMs), Viterbi algorithms, forward-backward algorithms, fixed-lag smoothing algorithms, Baum-Welch algorithms, Kalman filtering/linear quadratic estimation (LQE), etc. Collecting the sensor data may include aggregating data from various sensors, organizing the data by one or more criteria, and/or storing the sensor data in a data store (not shown) accessible to client device 102. In examples, the data store may be local to client device 102, remote to client device 102, or some combination thereof. For instance, sensitive user information such as user, account and/or device identifying information may be stored locally on a client device, whereas location, movement and promotional data may be stored remotely in a distributed storage system. The collected sensor data may be provided to (or be accessible by) an analysis utility, such as visit analysis system 106, via distributed network 104.

Visit analysis system 106 may be configured to evaluate a set of sensor data. In aspects, visit analysis system 106 may have access to one or more sets of sensor data. For example, client device 102 may transmit the sensor data or a representation thereof to visit analysis system 106. In another example, the sensor data may be input directly into visit analysis system 106. For example, visit analysis system 106 may provide, or have access to, an interface (such as an application or service) for interacting with sensor data. The interface may be used to enter data sets comprising real and/or training data, and assign labels correlating the data sets to one or more corresponding events (e.g., entering a venue, exiting a venue, suspending transit, analyzing a promotional item, etc.). In some aspects, the sensor data and/or the labeled event data may be provided to a data analysis component or utility (not illustrated). The data analysis component/utility (or portions thereof) may be located on client device 102 and/or one or more separate devices, such as visit analysis system 106. In examples, the data analysis component/utility may process the labeled or unlabeled sensor data to identify one or more location and/or movement events. Processing the sensor data may comprise parsing and identifying sensor data comprising geographical location data (e.g., latitude, longitude, elevation coordinates, etc.), Wi-Fi information (e.g., network frequency, mac address, signal strength, service set identifier (SSID), timestamps, etc.) and/or movement data (e.g., acceleration events, velocity information, etc.). In some aspects, one or more portions of the parsed data may be applied to one or more mathematical models or algorithms. For example, visit analysis system 106 may have access to signal strength conversion algorithm that interprets and/or converts a signal strength recorded in, for instance, decibel-milliwatts (dBm). As another example, visit analysis system 106 may have access to a signal analysis model that evaluates network frequency and Wi-Fi signal strength data to determine a distance traveled by a mobile device. As yet another example, visit analysis system 106 may have access to a signal delta model that uses a smoothing algorithm and observed network data to estimate the displacement of a mobile device over a period of time. Visit analysis system 106 may store the output from the mathematical models or algorithms in one or more data stores, such as storages(s) 108.

In aspects, visit analysis system 106 may additionally comprise, or have access to, one or more predictive models and/or algorithms. Exemplary models/algorithms include expectation-maximization (EM) algorithms, Hidden Markov Models (HMMs), Viterbi algorithms, forward-backward algorithms, fixed-lag smoothing algorithms, Baum-Welch algorithms, Kalman filtering/linear quadratic estimation (LQE), etc. The predictive models may be operable to determine visit detection information. For example, the predictive models may access a set of unlabeled data comprising events and corresponding sensor data. The data analysis engine may use the set of unlabeled data as input to an EM algorithm associated with a predictive model. An EM algorithm, as used herein, may refer to an iterative method for finding maximum likelihood or maximum a posteriori (MAP) estimates of parameters in statistical models, where the model depends on unlabeled data. The EM algorithm may use the set of unlabeled data to train the predictive models to detect when a mobile device user is visiting a venue. As another example, the predictive models may access a set of labeled data comprising labeled events and corresponding sensor data. The data analysis engine may use the set of labeled data as input to an HMM. An HMM, as used herein, may refer to a time series model for which a set of observed values are driven by a set of hidden states having Markov transitions. The HMM may use the set of labeled data to determine the most applicable parameter(s)/feature(s) in the set of labeled data (or to retune an existing set of parameter(s)/feature(s)). The determined parameter(s)/feature(s) may then be used to detect when a mobile device user is visiting a venue, or as an initialization point for, for example, an EM algorithm. In aspects, the predictive models or algorithms accessible to visit analysis system 106 may be located on client device 102, a remote device, or some combination thereof. For instance, one or more state predication algorithms may be implemented on client device 102 to perform visit detection/prediction. Implementation on client device 102 may minimize the network communications and battery usage to execute the state predication algorithms. In another instance, one or more algorithms may additionally or alternately be implemented on one or more remote devices to perform model training and data analysis. Implementations on the remote device(s) may leverage increased processing speed and power.

Figure 2:
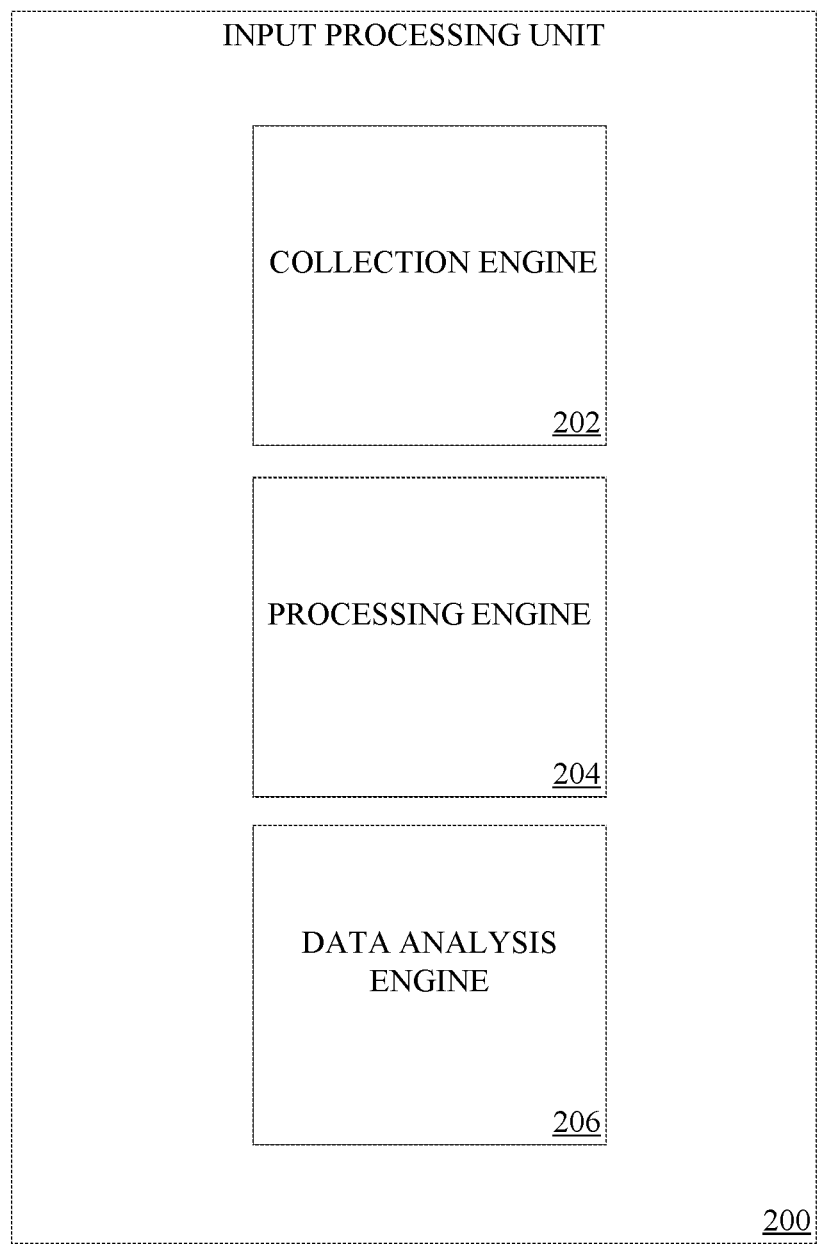
FIG. 2 illustrates an example input processing unit for implementing passive visit detection as described herein.

FIG. 2 illustrates an overview of an example input processing device 200 for visit detection, as described herein. The visit detection techniques implemented by input processing device 200 may comprise the visit detection techniques and content described in FIG. 1. In alternative examples, a single system (comprising one or more components such as processor and/or memory) may perform processing described in systems 100 and 200, respectively.

With respect to FIG. 2, input processing unit 200 may comprise collection engine 202, processing engine 204, data analysis engine 206 and observation engine 208. Collection engine 202 may be configured to collect or receive sensor data. In aspects, collection engine 202 may have access to one or more data sources that comprise and/or generate sensor data. The sensor data may represent input from a user or physical environment associated with one or more mobile devices. The data sources may be stored locally on input processing unit 200 or remotely on one or more computing devices. In some aspects, the data source(s) may transmit sensor data to collection engine 202 (or collection engine 202 may retrieve data from the data source(s)) continuously, at periodic intervals, on demand, or upon the satisfaction one or more criteria. In at least one aspect, collection engine 202 may provide, or have access to, an interface. The interface may enable a user to enter sensor data and data associated therewith. The interface may further provide for navigating and manipulating the data. For example, a user may use the interface to enter or upload a set of sensor data to collection engine 202. The set of sensor data may comprise labeled and or unlabeled data. The interface may enable the user to view the sensor data, assign labels to (or otherwise annotate) the sensor data and/or modify or remove the labels.

Processing engine 204 may be configured to process sensor data. In aspects, processing engine 204 may have access to collected sensor data. Processing engine 204 may process the labeled or unlabeled sensor data to identify one or more location and/or movement events. Processing the sensor data may comprise parsing and identifying sensor data comprising geographical location data (e.g., latitude, longitude, elevation coordinates, etc.), Wi-Fi information (e.g., network frequency, mac address, signal strength, service set identifier (SSID), timestamps, etc.), movement data (e.g., acceleration events, velocity information, etc.), etc. Processing the sensor data may additionally or alternately comprise evaluating labeled sensor data to identify and organize labels and corresponding sensor features into one or more groups. The sensor features may represent or correspond to one or more motion states, and may include data such as speed/velocity over an 'X' second time period, acceleration, distance from a previous point, Wi-Fi signal strength, etc. In aspects, the parsed sensor data may be used to generate one or more feature vectors. A feature vector, as used herein, may refer to an n-dimensional vector of numerical features that represent one or more objects. The feature vectors may comprise features of the sensor data and/or information from one or more knowledge sources or data stores. For example, a feature vector may comprise Wi-Fi information for one or more venues, promotional items corresponding to the venues, movement/displacement data for a mobile device, user venue check-in data, purchase date, event duration data, etc.

Data analysis engine 206 may be configured to determine whether a visit/stop event has occurred. In aspects, data analysis engine 206 may have access to one or more feature vectors or feature sets. Data analysis engine 206 may apply the feature vectors/sets to one or more statistical or predictive models/algorithms. Exemplary models/algorithms include expectation-maximization (EM) algorithms, Hidden Markov Models (HMMs), Viterbi algorithms, forward-backward algorithms, fixed-lag smoothing algorithms, Baum-Welch algorithms, Kalman filtering/linear quadratic estimation (LQE), etc. The models/algorithms may be located on input processing device 200, on one or more remote devices, or some combination thereof. For example, a first set of models/algorithms may be implemented on input processing device 200 to process/evaluate sensor data in real time, and a second set of models/algorithms may be implemented on one or more remote server devices to perform model training and big data analysis offline (or periodically). One or more models/algorithms may be in the first and second set of models/algorithms.

In aspects, the models/algorithms may be operable to determine (or may be trained to determine) visit detection information and/or venue detection information. For example, data analysis engine 206 may provide a feature vector/set to a model/algorithm operable to classify the various data points of a feature vector/set into 'N' classes or clusters. The classes may correspond to motion at various speeds (e.g., not moving, moving slowly, moving, moving quickly, etc.). The model/algorithm may evaluate the classes (or data therein) against the sensor data to correlate data points in the classes to motion states. Alternately, the model/algorithm may provide the classes and associated data to a separate model/algorithm to perform the correlation. The correlated data may be further evaluated to identify the transitions between motion states that most accurately determine the start and stop of a visit. For instance, a model/algorithm may classify a feature set corresponding to a set of training data into three classes. Class 1 may represent movement speeds less than one 1.0 per hour. Class 2 may represent movement speeds between 1 and 3 miles per hour. Class 3 may represent movement speeds greater than 3 miles per hour. In this example, the model/algorithm may determine that a transition from Classes 1 or 2 to Class 3 corresponds to a "moving" motion state, whereas a transition from Classes 3 or 2 to Class 1 corresponds to a "stopped" motion state. Alternately, a user may evaluate the transition data independently or with the assistance of the model/algorithm to make determinations about one or more motion states.

In a specific aspect, data analysis engine 206 may provide a set of training data comprising labeled and/or unlabeled data to an HMM. The HMM may be operable to determine the parameter(s)/feature(s) in the set of training data that are most relevant to detecting a visit or location-based event. Additionally, the HMM may be operable to determine one or more observations for the set of training data. An observation, as used herein, may describe a correlation or association between sensor data and one or more visit states (e.g., moving, stopped, visiting, not visiting, etc.). For instance, the HMM may determine the ideal conditions/behaviors (e.g., polling cycles, velocities, motion distributions, etc.) to optimize the visit detection analysis. In some aspects, the HMM may use the determined the values and data corresponding to the parameter(s)/feature(s) to train one or more models/algorithms, retune an existing set of parameter(s)/feature(s), or detect when a mobile device user is visiting a venue. In at least one example, the values and data corresponding to the parameter(s)/feature(s) may be used as an initialization point for, as an example, an EM algorithm.

Having described various systems that may be employed by the aspects disclosed herein, this disclosure will now describe one or more methods that may be performed by various aspects of the disclosure. In aspects, method 300 may be executed by an example passive visit detection system, such as system 100 of FIG. 1. In examples, method 300 may be executed on a device, such as input processing unit 200, comprising at least one processor configured to store and execute operations, programs or instructions. However, method 300 is not limited to such examples. In other examples, method 300 may be performed on an application or service for performing visit detection. In at least one example, method 300 may be executed (e.g., computer-implemented operations) by one or more components of a distributed network, such as a web service/distributed network service (e.g. cloud service).

Figure 3:
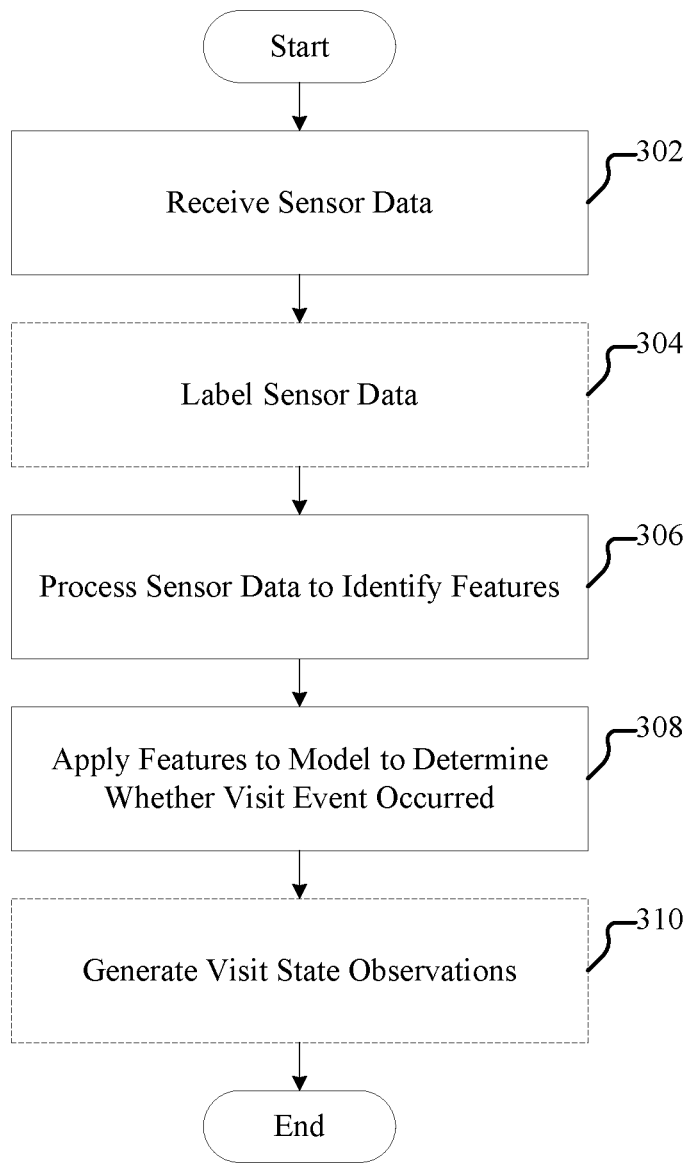
FIG. 3 illustrates an example method for implementing passive visit detection as described herein.
Figure 3:

FIG. 3 illustrates an example method 300 for venue detection, as described herein. Example method 300 begins at operation 302, where sensor data may be collected and stored by a computing device, such as client device 102 or input processing unit 200. In aspects, the computing device may comprise one or more sensors operable to collect data from a user or physical environment. The data collected by the sensors (e.g., sensor data) may include information and telemetry data, such as GPS coordinates/information, Wi-Fi information, OS information/settings, hardware information, accelerometer data, time information, etc. The sensor data may be collected in various ways and/or times. For instance, the sensor data may be transmitted by the sensors (or a subset of sensors) to a data store or a component of the computing device, or retrieved from the sensors using a computing device component, such as collection engine 202. The sensor data may be received at intermittently, at periodic intervals or on-demand. In some examples, the computing device may provide an interface to an application or service for interacting with the sensor data. In at least one example, the interface may only be available to a subset of approved users, such as super users, employees, testers, etc.

At optional operation 304, a client side interface may receive input associated with the sensor data. The input may include one or more labels for the sensor data and/or an event corresponding to the sensor data. For instance, upon arriving at work, a user may access an interface of the passive visit detection system to enter the label "entering work." In such an example, the interface may facilitate the collection of training data and may only be available to a subset of approved users, such as super users, employees, testers, etc. The interface may be used to associate the label with mobile device state data corresponding to the entered label. The state data may comprise or correspond to a visit state (e.g., moving, stopped, visiting, not visiting, etc.) and/or set of features/parameters (e.g., GPS coordinates, Wi-Fi signal data, time data, and accelerometer data) for a computing device (or user) at a given snapshot of time. The computing device may continue to periodically collect sensor data while the user is at work. Upon exiting work, the user may access the interface to enter the label "exiting work." The interface may again associate the label with mobile device state data corresponding to the entered label. Alternately, instead of manually entering in a label to the interface, the computing device may enter/assign a label to a set of sensor data based on one or more movement events or detected sensor data. For instance, upon detecting the computing device has exited a geo-fenced area around the location designated as "work," the computing device may assign the label "exiting work" and determine a visit state of "moving." In at least one example, the interface may additionally organize the state data into one or more discrete events. For instance, the interface may collect and package the sensor data collected between the "entering work" and "exiting work" labels. The interface may then package and label the event (e.g., "at work" event). While specific labeling examples have been provided herein, one of skill in the art will appreciate that these examples are but one aspect of the present disclosure. Labelling, in general, may be used to indicate when a visit to a venue begins (e.g., an entry) and ends (e.g., an exit). State data tracked between the entry and exit may be associated with a visit to a particular venue or location.

At operation 306, sensor data may be provided to one or more models. In aspects, the sensor data and/or label data collected in operation 302 may be provided to an analysis component, such as processing engine 204. The analysis component may comprise (or have access to) one or more models or algorithms. The models/algorithms (or instances thereof) may be operable to parse sensor data, identify sensor data features, generate feature sets, and perform various calculations based thereon. For example, a parsing component may be used to parse and identify a portion of sensor data comprising the following features:

```
[{'frequency': 2412,
  'macaddress': u'e2:55:7d:3f:4b:e3',
  'signalstrength': -63,
  'ssid': u'IIDI',
  'timestamp': 1467215627},
 {'frequency': 2412,
  'macaddress': u'e2:55:7d:3f:4b:e2',
  'signalstrength': -63,
  'ssid': u'IDEAL-GUEST',
  'timestamp': 1467215627},
 {'frequency': 2462,
  'macaddress': u'54:3d:37:3e:03:18',
  'signalstrength': -78,
  'ssid': u'Thrillist',
  'timestamp': 1467215627}]
```

The parsed data may be provided to one or more data analysis components, such as data analysis engine 206. The data analysis components may be, or may have access to, one or more models/algorithms. For instance, a first model may access the example sensor data above. The first model may apply the frequency data and the signal strength data to a signal strength algorithm to determine a distance between the computing device and the Wi-Fi network at a given timestamp (e.g., the '1467215627' timestamp). A second model may use the above sensor data and sensor data at a subsequent timestamp (e.g., 60 seconds after the '1467215627' timestamp) to determine the distance traveled between sensor data collection cycles. A third model may use the above sensor data and sensor data at a plurality of subsequent timestamps to plot an estimated course of travel for the computing device. The third model may be operable to filter errant or missing sensor values or distance miscalculations (e.g., jitter, noise, etc.) using one or more data smoothing techniques (e.g., rolling mean averages, geometric medians, etc.). In such an example, the operations and functionality of the first, second and/or third models may be incorporated into a single model or distributed across a plurality of models. For instance, the first model may be an HMM implementation that is extended with various features to perform the operations described above with respect to the first, second and third models. In aspects, the output from the data analysis component(s) may be transmitted to one or more devices (or device components) and/or stored in a data store, such as storage(s) 108.

At operation 308, one or more data analysis components may be used to determine whether a visit event occurred. In aspects, the data analysis component described above may incorporate one or more models to generate or detect visit and/or motion state information. The one or more models may be the same models (or comprise a subset of the models) described in operation 306. In examples, the models may be trained to (or be operable to) estimate/detect visit and/or motion state information for the computing device during one or more time periods using sensor data, state data and/or the output from one or more models. For example, a set of labeled data (such as training data) may correspond to the movement of a mobile device as a user travels from home to work. The set of labeled data may be provided to a model. The model may be located locally to the computing device or remotely on one or more remote server devices used to perform model training and big data analysis. The model may access the set of labeled data and/or data associated with the labeled data. The model may use the data to determine various visit and/or motion states for the computing device throughout the monitored time period. In one example, the label data may be used to identify a venue and/or predict whether a visit or a stop is occurring. For instance, a set of sensor data corresponding to a user arriving home may be provide to a model. Based on the label, such as "stopped" or "entering home," and a GPS coordinate set that matches the home address recorded for the user, the model may be trained to determine a visit state of "stop" or "visit" for a location designated as "home." Alternately, the model may provide a more descriptive visit and/or motion state analysis. For instance, the model may determine a motion state of "stopped at home" or a visit state of "visiting home," and may label the motion/visit state accordingly. In this example, the set of sensor data may also correspond to the user subsequently travelling to work. Based on the accelerometer data, GPS data, Wi-Fi signals, or other sensor data, the model may be trained to determine a motion state of "moving fast" or a visit state of "no visit." The set of sensor data may further correspond to the user arriving at work. Based on the label "arrived at work," a Wi-Fi signal (e.g., detection of "Work" Wi-Fi network), and/or GPS data, the model may be trained to determine a motion state of "stop." The set of sensor data may further correspond to the user entering work. Based on accelerometer data, a Wi-Fi signal (e.g., increased signal strength for "Work" Wi-Fi network), and/or GPS data, the model may be trained to determine a motion state of "moving slowly" or a visit state of "visit" or "visiting work." In some aspects, the trained model (or an instance thereof) and/or the parameters used to train the model may be transmitted to one or more other devices.

As another example, a set of unlabeled data may correspond to the movement of a mobile device as a user travels along a storefront. A model may access the set of unlabeled data and corresponding output from one or more statistical models to determine various visit states for the computing device throughout the monitored time period. For instance, for a first period of time, the model may analyze sensor data comprising a Wi-Fi signal (e.g., detection of "Store A" Wi-Fi network) over a successive period of ten polling cycles (e.g., a 10 minute time period). The model may determine that, because the Wi-Fi signal was detected during each of the ten polling cycles, the mobile device was continually proximate to Store A. Accordingly, the model may determine a visit state of "Visiting" for Store A. In response to the "Visiting" visit state, the model may collect and store the sensor data for the first period. For a second period of time, the model may analyze sensor data comprising multiple Wi-Fi signals (e.g., detection of "Store A" and "Store B" Wi-Fi networks) and corresponding signal strengths. Based on the sensor data, the model may determine the mobile device was proximate to Store B, but the mobile device did not actually enter the store. For instance, Wi-Fi network device for Store B may be 55 feet inside the storefront door. A device may record the signal strength of the "Store B" Wi-Fi network as −80 dBm at a radius of 55 feet from the Wi-Fi network device, −70 dBm at a radius of 25 feet from the Wi-Fi network device and −50 dBm at a radius of 5 feet from the Wi-Fi network device. Over the course of the second period of time, the mobile device may have recorded signal strengths between −85 and −80, indicating the mobile device did not enter Store B. Accordingly, the model may determine a visit state of "Traveling" or "Stopped" for Store B. In response to the "Traveling" visit state, the model may not collect and store the sensor data for the second period. For a third period of time, the model may use accelerometer data, one or more electronic messages (e.g., a text or email advertisement, coupon, event schedule, receipt, etc.) and GPS coordinates over a polling period to determine that the mobile device was proximate to Store C. For example, the model may identify that the mobile device was travelling away from Store C at 3.5 mph at 12:05 pm; the mobile device received an email advertisement for Store C at 12:06 pm; the mobile device altered its course to travel toward Store C at 12:08 pm; the mobile device was travelling toward from Store C at 3.5 mph between 12:08 and 12:15; the Store C Wi-Fi "Store C" was detected at 12:15 pm; and the mobile device was travelling at between 0.1 and 1.8 mph (e.g., browsing speeds) between 12:15 pm and 12:45 pm. Based on this data, the model may infer a visit state of "Visiting" for Store C. In response to the "Visiting" visit state, the model may collect and store the sensor data for the third period.

At optional operation 310, a set of observations may be generated for sensor data. In aspects, sensor data, visiting state inferences, and associated data may be used to generate one or more observations related to visit detection. In examples, visit state inferences and corresponding sensor data may be provided to an analysis component, such as visit analysis system 106 or data analysis engine 206. The analysis component may also have access to a data store, such as storage(s) 108, comprising previously generated visit state inferences and sensor data. The analysis component may analyze the current data and/or previously-generated data to determine one or more observations. The observations may be indicative of the probability that a particular sensor data feature (or set of sensor data features) is correlated (positively or negatively) to a visit state. For instance, the analysis component may analyze a set of collected sensor data to determine that 85% of users visit a venue when receiving an electronic communication from the venue within 500 feet of the venue. Accordingly, an observation reflecting the analysis may be generated. The analysis component may also determine that 65% of the visits to a certain venue occur on the weekends between the hours of 10:00 am to 1:30 pm. The analysis component may further determine that users travelling at speeds greater than 4.0 miles per hour perform significantly fewer visits than user travelling less than 3.1 miles per hour.

In aspects, one or more probabilities or confidence metrics may be generated for the observations. For example, an analysis component may generate a set of observations for a set of sensor data. The analysis component may calculate a confidence score for each of the observation in the set. The confidence score may reflect the predicted accuracy or strength of the observation. The confidence score may be based on previous observations of a user, observations for a set of users, distance-based analyses, user input, check-in data, purchase history, behavioral data, social network data, etc. In some aspects, the observations may be generated periodically, on-demand or according to a predefined condition. For example, the observations may be generated when the computing device comprising the analysis component is offline or using computational resources below a defined threshold. As another example, the observations may be generated when a visit state determination is performed. In at least one aspect, the analysis component may store the most-recently generated observations in a local data store. The stored observations may then be used during the generation of subsequent observations, in lieu of reprocessing the previous observation data. In such an aspect, the storage of the most-recently generated observations may result in increased battery efficiency and reduced computational load for a device.

Figure 4:
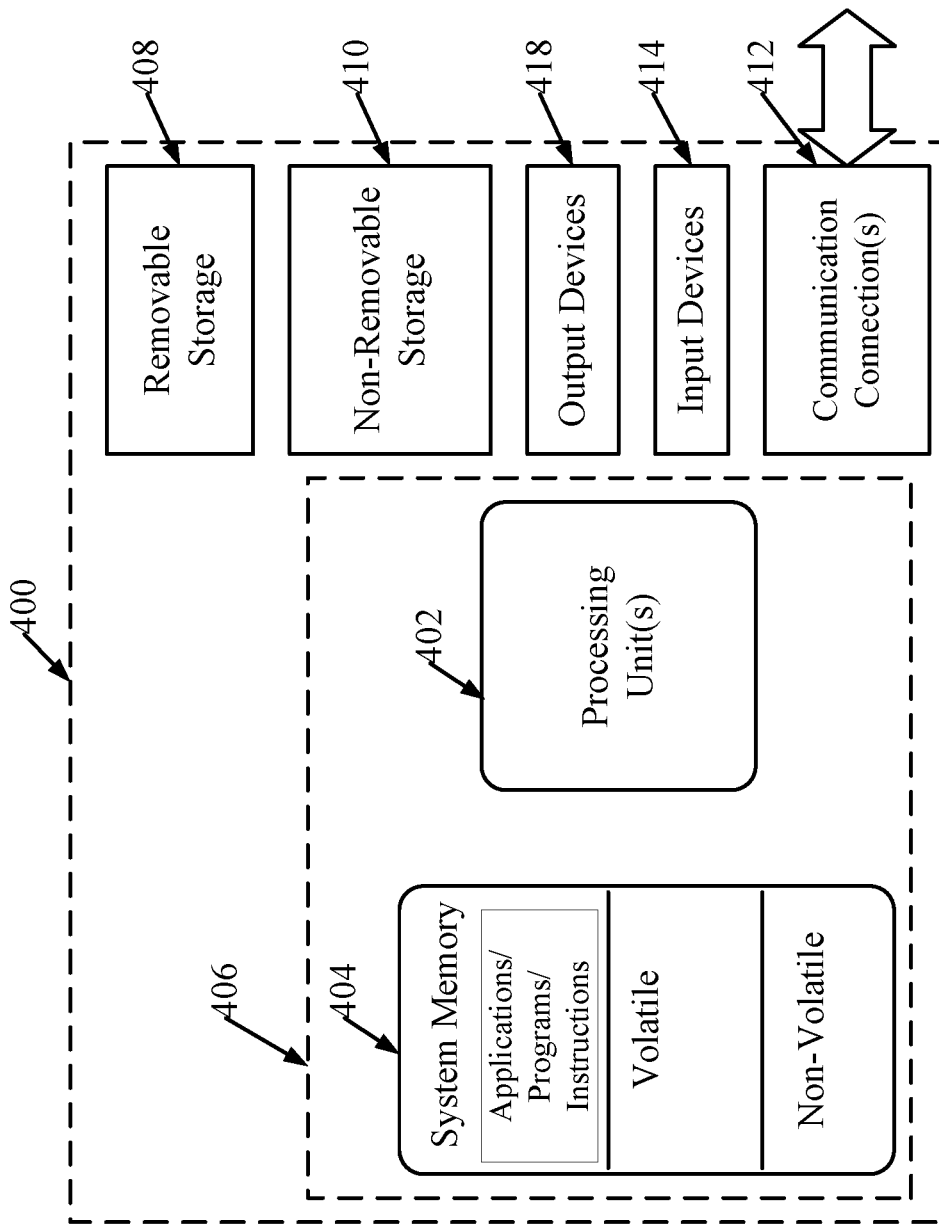
FIG. 4 illustrates one example of a suitable operating environment in which one or more of the present embodiments may be implemented.

FIG. 4 illustrates an exemplary suitable operating environment for the venue detection system described in FIG. 1. In its most basic configuration, operating environment 400 typically includes at least one processing unit 402 and memory 404. Depending on the exact configuration and type of computing device, memory 404 (storing, instructions to perform the passive visit detection embodiments disclosed herein) may be volatile (such as RAM), nonvolatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc. In embodiments, the connections may be operable to facility point-to-point communications, connection-oriented communications, connectionless communications, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments are described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system comprising:
one or more processors; and
memory coupled to at least one of the one or more processors, the memory comprising computer executable instructions that, when executed by the at least one processor, performs a method for passive visit detection, the method comprising:
receiving sensor data for a mobile device, wherein the sensor data comprises at least movement data for the mobile device and network data for a venue;
processing the sensor data to identify a feature set, wherein the feature set comprises a feature vector representing the movement data, the sensor data, and additional data associated with one or more candidate venues; and
evaluating the feature set in real time to determine whether a visit event has occurred.

2. The system of claim 1, the method further comprising:
detecting, by the mobile device, one or more events corresponding to the sensor data, wherein the one or more events correspond to at least one of movement events, purchase events, information delivery events and venue check-in events; and
correlating the one or more events to the one or more features.

3. The system of claim 1, wherein the network data comprises one or more Wi-Fi signal strengths for the venue.

4. The system of claim 1, wherein processing the sensor data comprises:
parsing the sensor data to identify the one or more Wi-Fi signal strengths;
using a statistical model to evaluate the identified one or more Wi-Fi signal strengths; and
generating, by the statistical model, at least a portion of the feature set.

5. The system of claim 4, wherein evaluating the one or more Wi-Fi signal strengths comprises using the Wi-Fi signal strengths to determine a distance between the mobile device and the venue.

6. The system of claim 4, wherein evaluating the one or more Wi-Fi signal strengths comprises:
observing a first set of network signals at a first time;
observing a second set of network signals at a second time; and
comparing the first set of network signals to the second set of network signals to determine an estimated distance traveled by the mobile device between the first time and the second time.

7. The system of claim 1, wherein evaluating the feature set comprises providing the feature set to a predictive model operable to detect a visit state of the mobile device for one or more venues.

8. The system of claim 7, wherein the predictive model is an HMM operable to determine features, in the feature sets, relevant to detecting a visit event.

9. The system of claim 8, wherein the features determined using the HMM are used as an initialization point for an EM algorithm operable to evaluate a set of unlabeled data.

10. The system of claim 8, wherein the predictive model is implemented on the mobile device, and the predictive model is operable to detect visit states in real time.

11. The system of claim 8, wherein the predictive model is implemented on a remote device operable to train the predictive model using labeled data and perform big data analysis.

12. The system of claim 1, wherein the method further comprises generating a set of observations for the sensor data, wherein the set of observations are indicative of a correlation between one or more features of the sensor data and a visit state.

13. The system of claim 1, wherein the system further comprises a user interface operable to receive user input comprising at least one of a data label and training data.

14. A method for passive visit detection, the method comprising:
receiving, at a mobile device, sensor data, wherein the sensor data comprises at least location data for the mobile device, movement data for the mobile device, and network data for a venue;
processing the sensor data in real time to generate a feature set for the sensor data, wherein the feature set comprises a feature vector representing the movement data, the sensor data, and additional data associated with one or more candidate venues; and
using an HMM implementation to evaluate the feature set in real time to determine a visit state of the mobile device.

15. The method of claim 14, wherein the sensor data comprises telemetry data for a first time period and at least a second time period, and wherein evaluating the feature set comprises comparing sensor data for the first time period to sensor data for the second time period.

16. The method of claim 15, wherein evaluating the feature set further comprises correlating features in the feature set to one or more events, wherein the one or more events correspond to at least one of movement events, purchase events, information delivery events and venue check-in events.

17. A method for passive visit detection, the method comprising:
   receiving, at a computing device, sensor data, wherein the sensor data comprises at least location data for a mobile device, movement data for the mobile device, and network data for a venue;
   processing the sensor data to generate a feature set for the sensor data, wherein the feature set comprises a feature vector representing the movement data, the sensor data, and additional data associated with one or more candidate venues; and
   using the feature set to train a predictive model to detect one or more visit states of the mobile device.

18. The method of claim 17, wherein the sensor data comprises a set of labeled data, and wherein the predictive model uses the set of labeled data to determine correlations between the set of labeled data and the one or more visit states.

19. The method of claim 18, wherein the determined correlations are stored in one or more data stores for use with subsequent training of the predictive model.

20. The method of claim 17, wherein an instance of the trained predictive model is transmitted to the mobile device.

* * * * *